July 26, 1966  R. B. ADAMS ET AL  3,262,466
FLOW CONTROL APPARATUS
Filed July 29, 1963
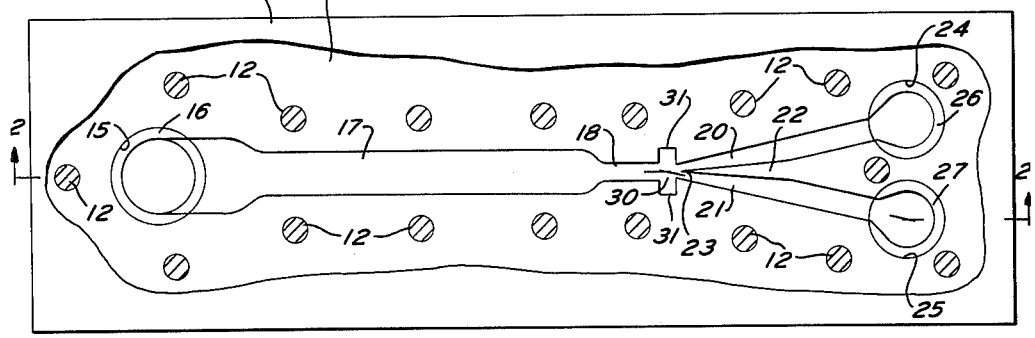
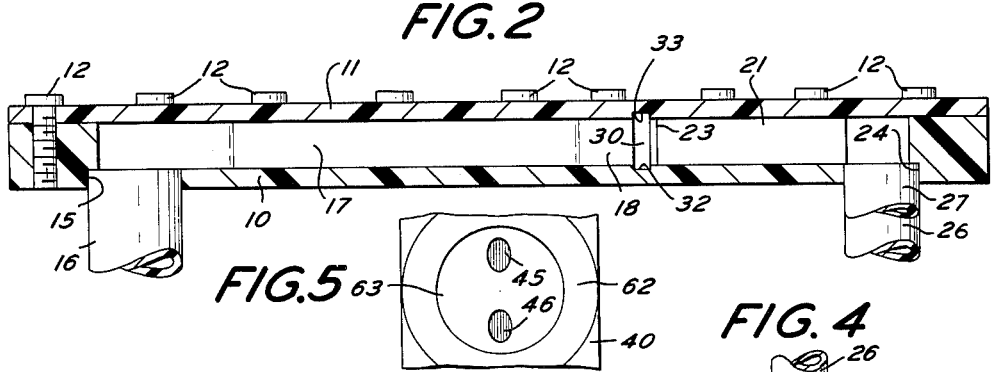
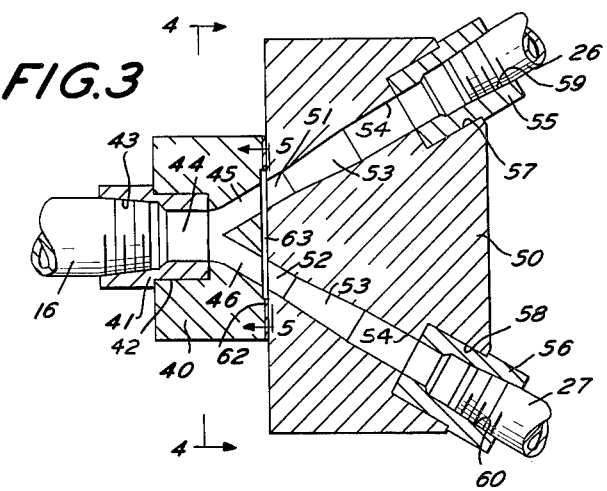
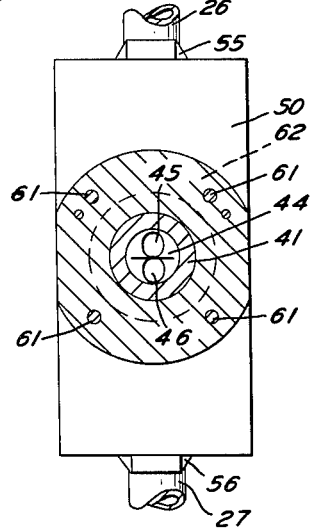
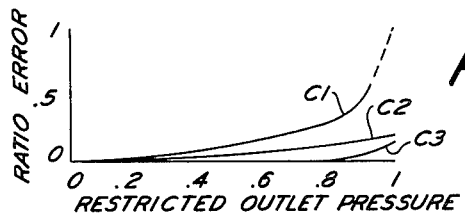
INVENTORS
ROBERT B. ADAMS
COLEMAN B. MOORE
BY
B. T. Wobensmith
ATTORNEY

# United States Patent Office 3,262,466
Patented July 26, 1966

3,262,466
FLOW CONTROL APPARATUS
Robert B. Adams, Bethayres, and Coleman B. Moore, Uwchland, Pa., assignors to Moore Products Co., Spring House, Pa., a corporation of Pennsylvania
Filed July 29, 1963, Ser. No. 298,285
2 Claims. (Cl. 137—561)

This invention relates to fluid flow control apparatus and more particularly to apparatus for dividing the flow into a plurality of streams by a divider interposed in the path of flow.

It has heretofore been proposed to provide apparatus in the form of a Y or a T in a pipe line to divide the flow between two branches. With the structures of this character heretofore available it has not been possible to maintain a constant division of the flow independent of pressure variations in the downstream branches.

It is the principal object of the present invention to provide fluid flow control apparatus in which the flow is divided in a predetermined proportion by structure which is self contained and which requires no external control signals or feed back connections from the downstream flow lines.

It is a further object of the present invention to provide fluid flow control apparatus in which the flow is divided in a predetermined proportion and in which downstream pressure variations do not adversely affect the predetermined proportion.

It is a further object of the present invention to provide fluid flow control apparatus for divided flow in a predetermined proportion and in which cavitation is advantageously utilized in one or more of the fluid passageways.

It is a further object of the present invention to provide fluid flow control apparatus for divided flow in a predetermined proportion with the fluid at enhanced kinetic energy followed by pressure recovery and in which the pressure recovery passageways have cavitation therein to reduce variations in the proportioning.

It is a further object of the present invention to provide fluid flow dividing apparatus having a portion for enhancing the kinetic energy of the fluid and an equalizing chamber which the fluid of enhanced kinetic energy traverses thereby preventing variations in the proportioning of the flow due to downstream pressure variations.

Other objects and advantageous features of the invention will be apparent from the description and claims.

The nature and characteristic features of the invention will be more readily understood from the following description taken in connection with the accompanying drawings forming part thereof, in which:

FIGURE 1 is a top plan view, of one form of flow control apparatus in accordance with the invention, part of the cover being broken away to show the interior construction;

FIG. 2 is a vertical longitudinal sectional view taken approximately on the line 2—2 of FIG. 1;

FIG. 3 is a vertical sectional view of another form of control apparatus in accordance with the invention, taken approximately on the line 3—3 of FIG. 4;

FIG. 4 is a transverse sectional view taken approximately on the line 4—4 of FIG. 3;

FIG. 5 is a fragmentary transverse sectional view, taken approximately on the line 5—5 of FIG. 3; and FIG. 6 shows performance curves for flow control apparatus illustrated in FIG. 1 as compared to a Y pipe fitting.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1 and 2 of the drawings the flow control apparatus there shown includes an elongated body portion 10 with a top cover plate 11 secured to the body portion 10 in any desired manner, such as by screws 12.

The body portion 10, at one end thereof, has an opening 15 for a fluid inlet pipe 16 which is connected to any desired source of fluid under pressure, the flow of which is to be divided or proportioned. The pipe 16 communicates with an elongated supply passageway 17 from which a nozzle 18, shown as rectangular in transverse cross section, extends. The purpose of the nozzle 18 is to deliver the fluid in the form of a jet with a portion of the energy of the fluid stream converted to kinetic energy.

The body portion 10, beyond the nozzle 18 has two diverging or recovery passageways 20 and 21 with a divider wall 22 therebetween preferably having a relatively sharp terminus 23 to split the stream. The wall 22 and its terminus 23 can be located as desired with respect to the central longitudinal axis of the nozzle 18 to provide the desired proportioning of fluid flow. A central straight axial line disposition would accommodate substantially equal division of flow, while by offsetting the same different proportioning can be effected as desired. The jet to divider distance is preferably short to reduce the tendency to deflection.

The passageways 20 and 21 extend to openings 24 and 25 with delivery pipes 26 and 27 extending therefrom for conducting the separated streams to the desired locations.

As shown in FIGS. 1 and 2, between the nozzle 18 and the terminus 23 an equalizing chamber 30 is provided which has side extensions 31 on each side and one or more cross connections connected thereto, such as cross passage 32 in the body portion 10 or cross passage 33 in the cover plate 11, or both, to provide for pressure equalization around the fluid jet. The chamber 30 is preferably closed by continuous walls and is preferably short in the direction of jet flow, i.e. shorter in the direction of jet flow than in width as shown in FIG. 1, and is of low impedance, so that all the boundaries of the jet in the chamber 30 are subject to the same ambient pressure.

Referring now more particularly to FIGS. 3, 4, and 5 of the drawings, the flow control apparatus there shown includes an inlet body portion 40 having an input fitting 41 secured in bore 42 therein in any desired manner. The input fitting 41 has an internally threaded portion 43 for connection of the fluid inlet pipe 16 and has a cylindrical pipe section 44 aligned with the threaded portion 43. The inlet body portion 40 and input fitting 41 can be made integral or in one piece if desired.

The inlet body portion 40 has a plurality of bores, two being shown by way of illustration, communicating with the pipe section 44, providing nozzles 45 and 46. The nozzles 45 and 46 may be circular in cross section and have suitable relative diameters as determined by the proportioning desired.

An outlet body portion or block 50 is also provided having passageways 51 and 52 for axial alignment with the nozzles 45 and 46. The passageways 51 and 52 each has a flaring recovery section 53 and straight section 54 and at their outer ends have inserted outlet fittings 55 and 56 in bores 57 and 58. The outlet fittings 55 and 56 have internally threaded portions 59 and 60 for the connection of the delivery pipes 26 and 27. The outlet body portion 50 and outlet fittings 55 and 56 can be made integral or in one piece, if desired.

The inlet body portion 40 and outlet body portion 50 are secured together in any desired manner such as by bolts 61 and with a gasket 62 interposed therebetween.

An equalizing chamber 63 is provided, interiorly of the gasket 62, of any desired shape. Merely as a matter of convenience the equalizing chamber 63 can be circular, as seen from the right of the inlet body portion 40. The equalizing chamber 63 extends outwardly beyond the bores 45 and 46 to provide for pressure equalization around the jets from each of the nozzles 45 and 46. The chamber 63 is also preferably closed by continuous walls and is also short in the direction of jet flow, i.e. shorter in the direction of jet flow than in width as shown in FIG. 3, and of low impedance so that all the boundaries of the jets in the chamber 63 are subject to the same ambient pressure.

The mode of operation will now be pointed out.

Referring first to FIGS. 1 and 2 of the drawings, fluid entering the inlet pipe 16 passes along the supply passageway 17 and to and through the nozzle 18. In the nozzle 18 the energy in the fluid stream is to a considerable extent converted to kinetic energy to form a fluid jet. This jet from the nozzle 18 is split by the terminus 23 of the divider wall 22 into two streams with proportioning as determined by the positioning of the terminus 23 and wall 22 with respect to the central longitudinal axis of the jet. The separated streams pass along the passageways 20 and 21 with pressure recovery prior to delivery through the openings 24 and 25 and the delivery pipes 26 and 27.

The stream from the jet formed by the nozzle 18, representing the entire fluid flow, traverses the equalizing chamber 30.

Any downstream pressure change in the pipes 26 or 27 is prevented from having a significant effect on the proportioning of the fluid flow while in a condition of enhanced or higher kinetic energy, by the action of the equalizing chamber 30 where the entire stream at high kinetic energy levels is at the same pressure environment. Downstream pressure variations which reach the chamber 30 are distributed on both sides of the jet. The equalizing chamber 30 thus prevents significant bending of the jet from the nozzle 18 and thereby insures the jet striking the divider 23 in essentially the same proportions under all downstream pressure conditions.

Referring now to FIGS. 3, 4 and 5, fluid entering the inlet pipe 16 passes into the input fitting 41 and the pipe 44, and is divided between the nozzles 45 and 46 in a proportion determined by the respective sizes of the nozzles 45 and 46. In the nozzles 45 and 46 conversion of potential to kinetic energy occurs as before. The separated streams from the nozzles 45 and 46 enter the passageways 51 and 52 and the recovery sections 53. In the recovery sections 53 of the passageways 51 and 52 pressure recovery is effected, with delivery of the separated streams of fluid through the outlet fittings 55 and 56 and the pipes 26 and 27.

The fluid streams, representing the entire fluid flow, passing from the nozzles 45 and 46 to the passageways 51 and 52 traverse the equalizing chamber 63.

Any downstream pressure change in the pipes 26 or 27 is prevented from having an appreciable effect on the fluid of higher kinetic energy in the nozzles 45 and 46, by the action of the equalizing chamber 63 where the entire stream, in separated streams but at high kinetic energy levels, is at the same ambient pressure.

It is known that cavitation occurs in a liquid stream whenever the pressure in the stream becomes less than the vapor pressure of the liquid. For water, at normal room temperature, cavitation will not occur unless the pressure head is reduced to about one half pound per square inch absolute. If ideal conditions were assumed, with no friction losses in the passageways, this condition would exist whenever practically the entire energy of the stream was in the form of velocity head. For practical conditions, in the case of an atmospheric outlet, the passageways could be designed in a specific case to give a velocity head of approximately 15 p.s.i. corresponding to a velocity of 45 feet per second.

For certain shapes of the passageways 20 and 21 it will be found that cavitation does occur in the passageways 20 and 21 when the inlet pressure is increased above a certain value. An evaluation of operation with cavitation in the pressure recovery regions 20 and 21 shows an improved accuracy of proportioning over a wider range of pressure changes.

Referring now to FIG. 6, comparative performance curves are there shown for purposes of explanation.

To obtain FIG. 6, the device of FIG. 1 was connected to a source of water at constant pressure. The flow and pressure was measured in both outlets. Initially both outlets were unrestricted. One of the outlets was gradually restricted and the pressure and flow in both outlets recorded as the restriction was increased.

If the value of the flow in one leg is represented by $Q_1$ and the total flow at the inlet by $Q_T$ from this a ratio of $Q_1/Q_T$ may be established. Changes in ratio are observable with changes in restriction in one of the outlets. The decrease in ratio divided by the initial ratio gives the ratio error stated as values of ordinates in FIG. 6 and the abscissas or horizontal values show the pressures in the restricted outlet as a proportion of the inlet pressure. Similar tests on the apparatus of FIGS. 3 and 4 gave substantially the same results.

The curve C1 of FIG. 6 shows the plotting for a Y pipe fitting.

The curve C2 shows the plotting for the structure of FIGS. 1 and 2 with pressure conditions such that no cavitation occurred. While this shows a marked improvement over the curve C1, a greater improvement occurs with cavitation in the recovery passageways 20 and 21, shown by curve C3. By the use of cavitation, constancy of flow dividing is extended to much greater downstream variations than with a non-cavitating condition.

We claim:
1. A fluid flow device having
   a fluid supply connection,
   divider nozzles of predetermined sizes connected to said fluid supply connection for separating the flow from said fluid supply connection into a plurality of fluid streams of proportioned flow,
   fluid delivery connections for each of said separated streams,
   said fluid delivery connections having diffusers therein for pressure recovery, and
   a pressure equalizing chamber in surrounding relationship to all of said streams downstream of said divider nozzles.
2. A fluid flow device as defined in claim 1 in which said fluid delivery connections have fluid passageways therein imparting a cavitation effect to the fluid streams therein.

References Cited by the Examiner

UNITED STATES PATENTS

| | | | |
|---|---|---|---|
| 1,628,723 | 5/1927 | Hall | 137—81.5 |
| 2,228,015 | 1/1941 | Neukirch | 137—81.5 |
| 3,001,698 | 9/1961 | Warren | 137—81.5 X |
| 3,107,850 | 10/1963 | Warren et al. | 137—81.5 X |
| 3,122,165 | 2/1964 | Horton | 137—81.5 |
| 3,124,160 | 3/1964 | Zilberfarb | 137—81.5 |
| 3,158,166 | 11/1964 | Warren | 137—81.5 |
| 3,182,674 | 5/1965 | Horton | 137—81.5 |
| 3,185,166 | 5/1965 | Horton | 137—81.5 |
| 3,187,763 | 6/1965 | Adams | 137—81.5 |
| 3,209,774 | 10/1965 | Manion | 137—81.5 |

M. CARY NELSON, *Primary Examiner.*

LAVERNE D. GEIGER, *Examiner.*

S. SCOTT, *Assistant Examiner.*